Feb. 17, 1942.   G. A. ROBINSON   2,273,330
DISPENSING DEVICE
Filed Oct. 14, 1938   2 Sheets-Sheet 1
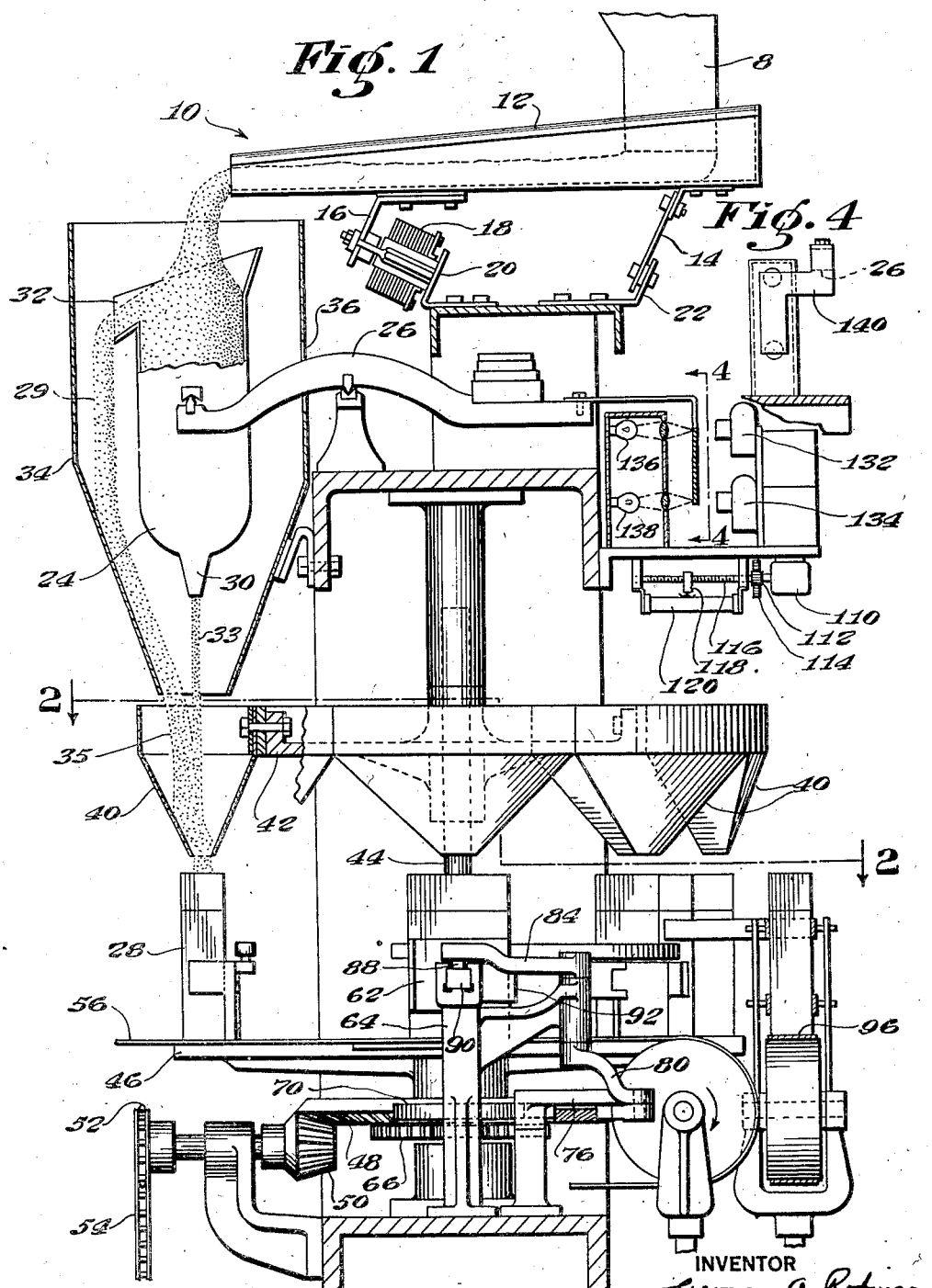
INVENTOR
George A. Robinson
BY J. Hinkey Churchill
ATTORNEY Feb. 17, 1942.   G. A. ROBINSON   2,273,330
DISPENSING DEVICE
Filed Oct. 14, 1938   2 Sheets-Sheet 2
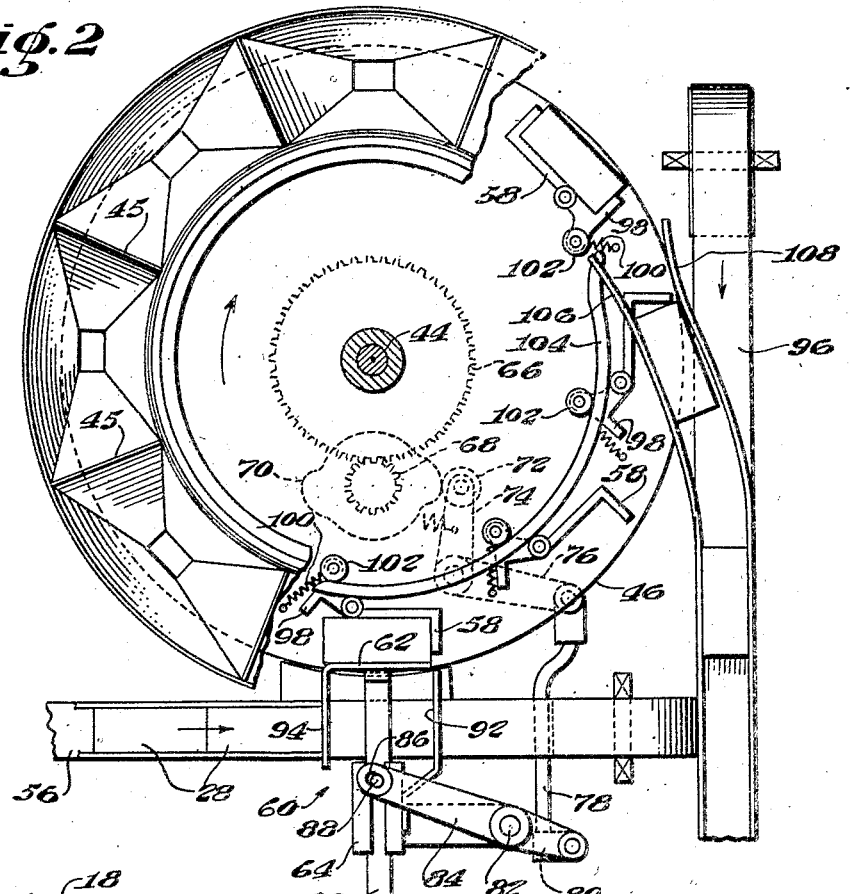
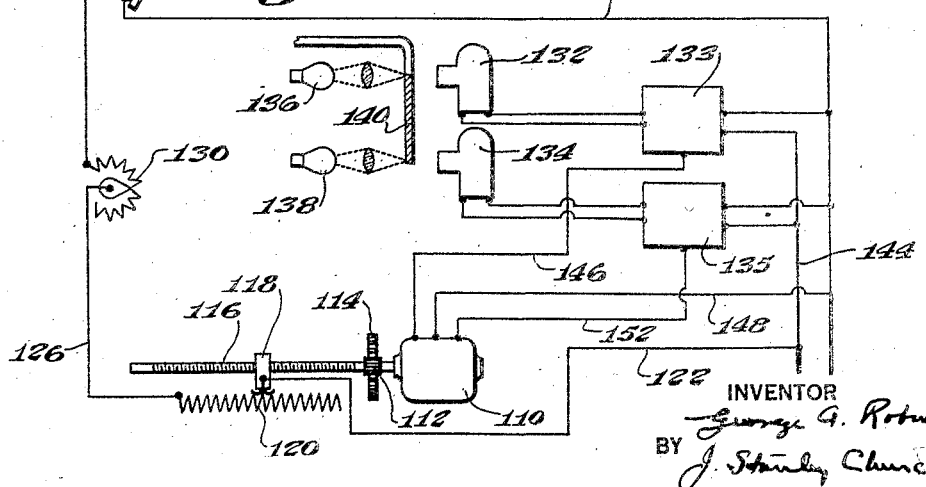
INVENTOR
George G. Robinson
BY J. Stanley Churchill
ATTORNEY Patented Feb. 17, 1942

2,273,330

UNITED STATES PATENT OFFICE 2,273,330

DISPENSING DEVICE

George A. Robinson, Milton, Mass., assignor to Pneumatic Scale Corporation, Limited, Quincy, Mass., a corporation of Massachusetts Application October 14, 1938, Serial No. 235,001

8 Claims. (Cl. 221—118)

This invention relates to a dispensing device.

The invention has for an object to provide a novel and improved dispensing device capable of accurately and automatically packaging solid flowable material in a rapid, economical and superior manner.

Another object of the invention is to provide a novel and greatly simplified dispensing device adapted to accurately fill successive packages with predetermined volumes of solid flowable material in a rapid, economical and superior manner and in which provision is made for varying the volume of material delivered to each package in accordance with the density of the material.

A further and more specific object of the invention is to provide a novel and improved dispensing device in which provision is made for feeding solid flowable material in a constant and uniform stream to the packages being filled and in which provision is made for increasing or decreasing the rate of flow of the material in accordance with any variation in the density of the material whereby the volume of material introduced into successive packages may be increased or decreased to the end that all of the packages filled will be provided with an equal weight of material irrespective of the variation in density.

With these objects in view and such others as may hereinafter appear, the invention consists in the dispensing device and in the various structures, arrangements and combinations of parts hereinafter described and particularly defined in the claims at the end of this specification.

In the drawings illustrating the preferred embodiment of the invention, Fig. 1 is a vertical sectional view of a filling machine embodying the present invention; Fig. 2 is a plan view of the lower section of the filling machine as viewed from the line 2—2 of Fig. 1; Fig. 3 is a wiring diagram of the controlling apparatus to be referred to, and Fig. 4 is a detail of a portion of the controlling apparatus as viewed from the line 4—4 of Fig. 1.

In general, the present invention contemplates a simple and practical machine capable of accurately filling successive packages in an extremely rapid manner and in which provision is made for varying the quantity of material being fed to the packages in accordance with the density of the material to the end that each package will contain a uniform weight of the material regardless of the variation in density.

Modern packaging methods demand high speeds in production and of all of the units in a packaging line, including the package forming, bottom sealing, top closing and package wrapping units, the filling or weighing unit is notoriously the slowest unit in the line. It has been the usual practice to weigh the material to be packaged in order to obtain accurate and uniform results but the rate of speed at which weighing machines are permitted to operate being limited because of the length of time required to effect a balance of the scale beam for each individual load has led inevitably to the development of machines for measuring predetermined quantities of material to be deposited in each package so as to effect a higher rate of speed in production. Such measuring and filling machines, as have been developed, while capable of producing uniform results with respect to volume have been found to vary over a wide range in weight due to the variations in density or compactness of the material and also to the variation in the moisture content of certain materials tending to be affected by atmospheric conditions.

In accordance with the present invention, provision is made for automatically increasing or decreasing the volume of material introduced into the packages in response to the variations in the density of the material with the result that accurate and uniform weights of material may be obtained in a filling machine capable of operating at extremely high speeds. In order to obtain this result, provision is made for determining the density of the stream of material being fed by continuously weighing a sample volume of the flowing material and for varying the rate of flow in accordance with the density indicated. In the preferred embodiment of the invention, a scale is provided for weighing a predetermined quantity of the flowing stream of material and provision is made for varying the rate of flow of the stream in response to the movements of the scale beam. The scale beam is preferably provided with a receptacle adapted to intercept and temporarily retain or retard a predetermined quantity of the constantly flowing stream of material being fed. The material flowing into the receptacle is preferably permitted to continuously escape from the receptacle at a uniform rate of flow so that in operation the material in the receptacle is continuously being changed. The amount of material being retained or retarded in the receptacle will preferably be relatively greater in proportion to the amount of material being introduced into the individual packages in order to obtain a more accurate indication of the weight of material per unit of bulk than would otherwise be possible. In other words, changes in the weight of a large bulk of the material are more readily detected than if a relatively small amount is weighed. In operation, the packages to be filled are preferably maintained in continuous motion, being moved at a fixed rate of speed beneath the stream of material escaping from the receptacle, so that the individual quantity of material received into each package is determined by the rate of flow of the stream and the length of time the stream is permitted to flow into each package. The stream of material is preferably guided into the package by funnels disposed above each package and moving along at the same rate of speed as the packages and the funnels are preferably arranged contiguous to one another so that the dividing line between each funnel serves to cut off the stream being delivered to each package.

Referring now to the drawings, 8 represents the storage hopper for the bulk supply of material from which the material flows by gravity into the material delivery unit 10 including a conduit 12 which is arranged to be vibrated to feed the material in a uniform stream. The delivery conduit is mounted to vibrate through connections including a thin metal strap 14 at one end and a second strap 16 at the other end is connected to an electrically operated vibratory motor 18 of any usual or preferred construction. The vibratory feeding unit 10 is supported by angle straps 20, 22 secured to the machine frame.

The vibratory unit 10 is continuously operated to feed a constant and uniform stream of material into and through a receptacle 24 mounted upon the weighing end of a scale beam 26 and provision is made, as will be described, for controlling the rate of vibration of the unit 10 in accordance with the density of the material as indicated by the weight of the material within the receptacle 24. The receptacle 24 is adapted to hold a relatively greater amount of material than the quantity to be deposited in each package 28, preferably at least three or four times as much, and, as herein shown, the receptacle is provided with a nozzle 30 at its lower end, having an orifice through which the material is permitted to escape in a constant but relatively small stream 33. The upper portion or mouth of the receptacle is provided with a spout 32 through which the major portion 29 of the material being received is permitted to overflow and to join the smaller stream 33 of material escaping through the nozzle 30 to produce a uniform stream 35 to be delivered into the packages. The receptacle is preferably enclosed within a hopper 34 having an opening 36 for the scale beam.

As herein shown, the material is preferably introduced into the packages through individual funnels 40 which are arranged to be moved along with the packages 28 beneath the continuously flowing stream. The funnels 40 are arranged in contiguous relationship and as herein shown, may be radially arranged and supported upon a disk 42 fixed to a vertical driving shaft 44 and rotated therewith. The dividing walls 45 between adjacent funnels serve to cut off or deflect the stream from one funnel to the next as the latter are revolved beneath the stream.

The packages 28 are supported upon a circular plate 46 which is also fixed to and rotated with the vertical shaft 44. The vertical shaft 44 may be rotated through connections including the bevel gear 48 secured to the shaft 44 and cooperating with a pinion 50, and through a sprocket 52 which may be connected by a chain 54 to any usual or preferred driving means, not shown.

In the operation of the machine, the empty packages 28 are delivered to the filler upon an incoming conveyor 56 and each package is transferred from the conveyor into an open pocket 58 mounted upon and rotating with the supporting plate 46 by an intermittently operated pusher mechanism indicated generally at 60, and in timed relation to the rotation of the plate 46. As herein shown, the pusher plate 62 is slidably mounted in a supporting bracket 64 and is arranged to be reciprocated through connections from the vertical shaft 44 including cooperating gears 66, 68, and a double lobed cam 70 cooperating with a roller 72 mounted upon one arm 74 of a bell crank. The other arm 76 of the bell crank is connected by a link 78 to an arm 80 fixed to the lower end of a vertical rocker shaft 82. A second arm 84 fixed to the upper end of the shaft 82 is provided with a slotted portion 86 which cooperates with a stud 88 fixed in the pusher bar 90. In operation, when the pusher is in its retracted position, the line of packages on the conveyor 56 comes to rest against a stop member 92 and as the pusher transfers the endmost package onto the plate 46, the remaining packages in the line are held back by the right angle extension 94 of the pusher 62.

As herein shown, one side of each pocket 58 is arranged to be opened to release the filled package onto the outgoing conveyor 96 and to remain opened until an empty package has been transferred thereto by the pusher 62. To this end, one side 98 of each pocket is pivotally mounted and is normally held in rectangular alignment with the stationary section of the pocket by a spring 100. The pivotally mounted section 98 is provided with a cam roller 102 which is arranged to engage a stationary cam member 104 to open the pocket at the releasing station and to maintain the pocket in its open condition until an empty package has been deposited therein at the transfer station whereupon the member 98 is permitted to close upon the package and to retain the package in position beneath its funnel 40.

From the description thus far, it will be seen that the empty cartons are retained in position beneath the individual funnels 40 by the pockets 58 and that each funnel receives an equal amount of the material as it passes beneath the filling station since the funnels travel at a fixed and uniform rate of speed and a uniform rate of flow of material is maintained at the filling station. Any material which has not entirely passed through the funnel 40 into the package at the filling station, is permitted to flow into the package during its progress to the releasing station, where the completely filled packages are received between guide rails 106, 108 and pushed onto the delivery belt 96 by the pocket 58.

Referring now to Figs. 1 and 3, the apparatus for detecting any variation in the weight of the load of material within the receptacle 24, or in other words, in the density of the material flowing through the receptacle 24 and for varying the rate of feed in accordance therewith is shown as comprising a circuit for the operation of the vibratory motor in which provision is made for automatically increasing or decreasing the resistance in the circuit to vary the amplitude of vibration and accordingly, to vary the rate of feed of the material. The mechanism for automatically varying the resistance in the circuit includes a reversible motor 110 operatively connected through gearing 112, 114 to a threaded rod 116 adapted to advance or retract a connector 118 in contact with a resistance coil 120 in series with the vibratory motor 18, in accordance with the direction of rotation of the rod 116. As illustrated in Fig. 3, the circuit to the vibratory motor 18 comprises the lead wire 122 to the resistance coil 120, wire 126, to the vibrator motor and wire 128 back to the main line. A manually operated rheostat 130 may be included in the circuit for initially adjusting the rate of vibration of the motor 18, for the preferred or normal rate of flow.

The automatic operation of the reversible motor 110 is controlled by two photo-electric cell relay switches including the light sensitive cells 132, 134 and the relays 133, 135 adapted to be operated by light beams from a source of light 136, 138 respectively. Under normal operating conditions when the scale beam is in balance the light beams are cut off by a shield plate 140 secured to the counterweight end of the scale beam 26. Thus, normally the circuits to the reversible motor 110 are open and no current flows. However, when the material in the receptacle 24 becomes lighter or less dense, the counterweight end of the scale beam is lowered thereby uncovering the light beam from the source 136 and permitting the relay 133 to close the circuit to the motor 110 to effect rotation of the rod 116 in a direction to decrease the resistance in the vibratory circuit whereby the material is caused to be fed at an increased rate until the proper balance is reached. The circuit to the relay 133 includes the lead 144 to the relay, wire 146 to the motor and wire 148 back to the main line. Conversely, when the material in the receptacle becomes heavier, thereby indicating that the material has become more dense, the counterweight end of the scale beam is raised to uncover the light source 138. This permits the relay 135 to close the circuit to the motor 110 to effect rotation of the rod 116 in the opposite direction to increase the resistance in the circuit to the vibratory motor 18. Thus, the rate of flow of the material is decreased to feed less material. The circuit to the relay 135 includes the lead wire 144 to the relay, wire 152 from the relay to the motor and wire 148 back to the main line.

From the description thus far, it will be apparent that the material being retarded in the receptacle 24, although in continuous motion and constantly being changed will remain practically constant in volume and that the variation in the weight of this volume in the receptacle controls the rate of vibration of the conduit 12 to feed more or less material. This, in turn, causes the stream 29 emanating from the overflow spout 32 of the receptacle to be varied so that the final stream 35 formed by the stream 29 and the nozzle stream 33 will be increased or decreased in accordance with the variation in the density of the material. As hereinbefore stated, the proportion of the material being retarded in the receptacle is relatively greater, preferably three or four times as much, as the amount of the material delivered to the individual packages, in order to obtain a more accurate gauge of the density of the material being fed. Thus, it will be seen that the volume of the material in the completed package is varied inversely with the density of the material being fed, resulting in substantially equal weights of material in each package.

It will be observed that the filling machine of the present invention is simple in construction having relatively few parts resulting in economies in manufacture and production. The present machine is continuous in operation and, in practice, is capable of speeds as high as 100 packages per minute while producing packages having substantially equal weights within the limits attained by the most efficient but comparatively slower and more expensive weighing machines, now upon the market.

Although in the illustrated embodiment of the invention, a vibratory feeding unit is shown as the preferred form of feeding device for maintaining a uniform rate of flow, lending itself readily to being controlled to increase or decrease its amplitude of vibration, it will be apparent that any other suitable form of feeding device may be employed and that the controlling apparatus need not be limited to photo-electric relay switches. In some instances, particularly in a straight-line embodiment of the invention, the funnels 40 may be dispensed with, and contiguous packages moved beneath the stream, the adjacent side walls of the packages serving to cut off the stream from one package to the next.

Viewed in its broader aspects, other mechanism may be employed for increasing or decreasing the volume of the material being fed in accordance with the density of the material, and as one modification of the illustrated embodiment, it may be preferred, by suitable mechanism, to automatically raise or lower a gate, not shown, located on the supply hopper 8 to permit more or less material to enter the conduit 12 while maintaining the vibration of the conduit 12 constant. Thus, the depth or cross-sectional area of the stream may be varied to increase or decrease the volume in accordance with the density, as indicated in the manner above described.

Also, since the amount of material permitted to enter into each package is determined by the rate of flow of the stream and the time the stream is permitted to flow into each package, it will be apparent that the illustrated embodiment of the invention may be modified to permit a constant stream to flow while varying the speed of movement of the packages and hence the time of flow in accordance with the density as indicated in the manner above described.

While the preferred embodiment of the invention has been herein illustrated and described, it will be understood that the invention may be embodied in other forms within the scope of the following claims.

Having thus described the invention, what is claimed is:

1. A dispensing device having, in combination, a vibratory material feeding conduit for feeding the material in a stream, a scale including a scale beam, a receptacle mounted on said scale beam into which the stream of material is discharged from said conduit, said receptacle having a discharge outlet at its lower end whereby an everchanging and relatively large mass of material is contained therein, and means controlled by movement of said scale beam for increasing the vibration of said conduit when the weight of said predetermined volume of material becomes less than the predetermined amount and for retarding the vibration of said conduit when the weight of said predetermined volume of material becomes greater than the predetermined amount.

2. A dispensing device having, in combination, material feeding means for feeding the material in a stream, a receptacle into which a stream of the material is discharged, said receptacle having a discharge outlet at its lower end whereby an everchanging and relatively large mass of material is contained therein, means for determining the weight of said mass of material, and control means actuated by variations in such weight from a predetermined amount for automatically varying the rate of flow of said stream.

3. A dispensing device having, in combination, material feeding means for feeding the material in a stream, a receptacle into which a stream of the material is discharged, said receptacle having a discharge outlet at its lower end whereby an everchanging and relatively large mass of material is contained therein, means for determining the weight of said mass of material, and control means actuated by variations in such weight from a predetermined amount for automatically increasing the rate of flow of said stream when said weight is less than the predetermined amount and for decreasing the rate of flow when said weight is greater than the predetermined amount.

4. A dispensing device having, in combination, a vibratory material feeding conduit including means for imparting relatively high frequency vibration to said conduit adapted to feed solid flowable material in a continuous and substantially uniform stream, a scale including a scale beam, a receptacle mounted on said scale beam into which the stream of material is discharged from the feed conduit, said receptacle having a discharge outlet at its lower end whereby an everchanging and relatively large mass of material is contained therein, an electrical circuit for operating said vibratory feeding conduit, and means including a reversible motor controlled by the movement of said scale beam for decreasing the resistance in said circuit when the weight of said predetermined volume is less than normal and for increasing the resistance in said circuit when the weight of said predetermined volume is greater than normal.

5. A dispensing device having, in combination, material feeding means for causing the material to flow in a stream, means for continuously separating out a portion of the material being fed to form an everchanging relatively large sample mass thereof of substantially constant volume, means for weighing said sample volume of material to determine variations in the density of the material being fed, and means responsive to such variations in density for automatically varying the rate at which the material is fed.

6. A dispensing device having, in combination, material feeding means for causing the material to flow in a stream, means for continuously separating out a portion of the material being fed to form an everchanging relatively large sample mass thereof of substantially constant volume, means for weighing said sample volume of material to determine variations in the density of the material being fed, and means responsive to said variations for increasing the rate of flow of the material when the density thereof falls below the predetermined amount and for decreasing the rate of flow of the material when the density thereof increases above said predetermined amount.

7. A dispensing device having, in combination, material feeding means for causing the material to flow in a stream including a vibratory conduit, means for imparting vibration thereto, means for continuously separating out a portion of the material being fed to form an everchanging relatively large sample mass thereof of substantially constant volume, means for weighing said sample volume of material to determine variations in the density of the material being fed, and means responsive to such variations in density for automatically varying the rate at which the material is fed.

8. A dispensing device having, in combination, material feeding means for feeding the material in a stream including a vibratory conduit, means for imparting vibration thereto, means for continuously separating out a portion of the material being fed to form an everchanging relatively large sample mass thereof of substantially constant volume, means for weighing said sample volume of material to determine variations in the density of the material being fed, and means responsive to said variations for increasing the rate of flow of the material when the density thereof falls below the predetermined amount and for decreasing the rate of flow of the material when the density thereof increases above said predetermined amount.

GEORGE A. ROBINSON.